(12) United States Patent
Schenken et al.

(10) Patent No.: US 8,996,289 B2
(45) Date of Patent: *Mar. 31, 2015

(54) GEOFENCE-BASED TRIGGERS FOR AUTOMATED DATA COLLECTION

(71) Applicant: United Parcel Service of America, Inc., Atlanta, GA (US)

(72) Inventors: Christopher T. Schenken, Alpharetta, GA (US); Mark J. Davidson, Alpharetta, GA (US)

(73) Assignee: United Parcel Service of America, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/148,978

(22) Filed: Jan. 7, 2014

(65) Prior Publication Data

US 2014/0121957 A1 May 1, 2014

Related U.S. Application Data

(63) Continuation of application No. 13/052,287, filed on Mar. 21, 2011, now Pat. No. 8,670,933.

(60) Provisional application No. 61/316,664, filed on Mar. 23, 2010.

(51) Int. Cl.
| | |
|---|---|
| G06F 19/00 | (2011.01) |
| G01C 21/00 | (2006.01) |
| B60W 40/09 | (2012.01) |
| G06Q 10/08 | (2012.01) |
| G06Q 50/28 | (2012.01) |
| G07C 5/08 | (2006.01) |
| G07C 5/00 | (2006.01) |

(52) U.S. Cl.
CPC ............. *G01C 21/00* (2013.01); *B60W 40/09* (2013.01); *B60W 2550/402* (2013.01); *G06Q 10/08* (2013.01); *G06Q 50/28* (2013.01); *G07C 5/008* (2013.01); *G07C 5/0866* (2013.01)
USPC ........................................................ 701/120

(58) Field of Classification Search
None
See application file for complete search history.

(56) References Cited

U.S. PATENT DOCUMENTS

| | | | |
|---|---|---|---|
| 6,577,937 B1 | 6/2003 | Shuman et al. | |
| 7,660,577 B2 * | 2/2010 | Radosta et al. | 455/424 |
| 8,326,315 B2 * | 12/2012 | Phillips et al. | 455/456.1 |

(Continued)

FOREIGN PATENT DOCUMENTS

| | | |
|---|---|---|
| CN | 101124842 A | 2/2008 |
| WO | WO 2010/027469 A1 | 3/2010 |

OTHER PUBLICATIONS

Written Opinion of International Search Authority dated Feb. 23, 2012 for Application No. PCT/US2011/029329.

(Continued)

*Primary Examiner* — Thomas Tarcza
*Assistant Examiner* — Adam Alharbi
(74) *Attorney, Agent, or Firm* — Alston & Bird LLP

(57) ABSTRACT

Systems, methods, apparatus, and computer program products are provided for automated data collection using geofence-based triggers. In one embodiment, the location of a vehicle can be monitored by a variety of computing entities. By using the vehicle's location, it can be determined when the vehicle enters and/or exits defined geofences. After a determination that a vehicle has entered or exited a defined geofence, one or more events can be automatically triggered/initiated.

24 Claims, 5 Drawing Sheets

(56) References Cited

U.S. PATENT DOCUMENTS

| | | | |
|---|---|---|---|
| 8,447,804 B2* | 5/2013 | Bai et al. | 709/203 |
| 8,670,933 B2 | 3/2014 | Schenken et al. | |
| 8,686,841 B2* | 4/2014 | Macheca et al. | 340/426.19 |
| 2003/0137426 A1 | 7/2003 | Anthony et al. | |
| 2004/0152485 A1* | 8/2004 | Deeds | 455/556.1 |
| 2005/0101268 A1 | 5/2005 | Radosta et al. | |
| 2006/0270421 A1 | 11/2006 | Phillips et al. | |
| 2008/0162034 A1* | 7/2008 | Breen | 701/202 |
| 2008/0174485 A1 | 7/2008 | Carani et al. | |
| 2008/0221776 A1 | 9/2008 | McClellan | |
| 2009/0197584 A1* | 8/2009 | Snow et al. | 455/418 |
| 2009/0232358 A1* | 9/2009 | Cross | 382/103 |
| 2009/0243925 A1 | 10/2009 | Kellermeier et al. | |
| 2010/0094688 A1 | 4/2010 | Olsen, III et al. | |
| 2010/0094769 A1 | 4/2010 | Davidson et al. | |
| 2010/0100315 A1 | 4/2010 | Davidson et al. | |
| 2010/0100507 A1 | 4/2010 | Davidson et al. | |
| 2010/0148947 A1* | 6/2010 | Morgan et al. | 340/426.22 |
| 2010/0217480 A1 | 8/2010 | Link, II | |
| 2011/0025496 A1* | 2/2011 | Cova et al. | 340/539.13 |
| 2011/0224898 A1 | 9/2011 | Scofield et al. | |

OTHER PUBLICATIONS

International Search Report and Written Opinion for PCT/US2011/029329, filed Mar. 22, 2011.

"Car-Cameras-Mobile-Vehicle-Camera-Systems" [online] [retrieved Aug. 12, 2011] Retrieved from the Internet:< http ://www.spytechs.com/Car-Cameras/default.htm > 4 pages.

"In-Vehicle-Dash-Camera-Recording-System" [online] [retrieved Aug. 12, 2011] Retrieved from the Internet: < http://www.truckercam.com/ > 1 page.

International Preliminary Examining Authority, International Preliminary Report on Patentability, including Applicant's Response to First Written Opinion, dated May 14, 2012, 13 pages, European Patent Office, Germany.

United States Patent and Trademark Office, Notice of Allowance and Fee(s) Due for U.S. Appl. No. 13/052,287, Nov. 8, 2013, 8 pages, USA.

United States Patent and Trademark Office, Corrected Notice of Allowability for U.S. Appl. No. 13/052,287, Nov. 25, 2013, 3 pages, USA.

United States Patent and Trademark Office, Office Action for U.S. Appl. No. 14/148,989, Jul. 15, 2014, 16 pages, USA.

* cited by examiner ics, and vehicle environments can be very important. For example, when a driver is operating a vehicle in a representative capacity of an employer, the driver's behavior is a direct reflection on the employer. For this and various other reasons, a solution is needed to automatically trigger/initiate the collection of data.

GEOFENCE-BASED TRIGGERS FOR AUTOMATED DATA COLLECTION

CROSS REFERENCE TO RELATED APPLICATIONS

This application is a continuation of U.S. patent application Ser. No. 13/052,287 filed Mar. 21, 2011, which claims priority to U.S. Patent Application Ser. No. 61/316,664 filed Mar. 23, 2010, which is hereby incorporated herein in its entirety by reference.

BACKGROUND

Monitoring driver behavior, vehicle cargo, vehicle operating conditions, and vehicle environments can be very important. For example, when a driver is operating a vehicle in a representative capacity of an employer, the driver's behavior is a direct reflection on the employer. For this and various other reasons, a solution is needed to automatically trigger/initiate the collection of data.

BRIEF SUMMARY

In general, embodiments of the present invention provide systems, methods, apparatus, and computer program products for automated data collection using geofence-based triggers.

In accordance with one aspect, a method for automated data collection using geofence-based triggers is provided. In one embodiment, the method comprises monitoring the location of a vehicle to determine whether the vehicle has entered a geofenced area, wherein (1) data associated with the vehicle is collected while the vehicle is operated outside the geofenced area and (2) the data is selected from the group consisting of (a) image data collected via one or more imaging devices disposed on the vehicle and (b) telematics data collected via one or more data collection devices disposed on the vehicle; and after determining that the vehicle has entered the geofenced area, automatically stopping the collection of the data while the vehicle is operated within the geofenced area.

In accordance with another aspect, a method for automated data collection using geofence-based triggers is provided. In one embodiment, the method comprises monitoring the location of a vehicle to determine whether the vehicle has exited a geofenced area, wherein (1) data associated with the vehicle is collected while the vehicle is operated within the geofenced area and (2) the data is selected from the group consisting of (a) image data collected via one or more imaging devices disposed on the vehicle and (b) telematics data collected via one or more data collection devices disposed on the vehicle; and after determining that the vehicle has exited the geofenced area, automatically stopping the collection of the data while the vehicle is operated outside the geofenced area.

In accordance with yet another aspect, a system comprising one or more imaging devices and one or more data collection devices is provided. In one embodiment, the system is configured to at least monitor the location of a vehicle to determine whether the vehicle has entered a geofenced area, wherein (1) data associated with the vehicle is collected while the vehicle is operated outside the geofenced area and (2) the data is selected from the group consisting of (a) image data collected via one or more imaging devices disposed on the vehicle and (b) telematics data collected via one or more data collection devices disposed on the vehicle; and after determining that the vehicle has entered the geofenced area, automatically stop the collection of the data while the vehicle is operated within the geofenced area.

In accordance with still another aspect, a system comprising one or more imaging devices and one or more data collection devices is provided. In one embodiment, the system is configured to at least monitor the location of a vehicle to determine whether the vehicle has exited a geofenced area, wherein (1) data associated with the vehicle is collected while the vehicle is operated within the geofenced area and (2) the data is selected from the group consisting of (a) image data collected via one or more imaging devices disposed on the vehicle and (b) telematics data collected via one or more data collection devices disposed on the vehicle; and after determining that the vehicle has exited the geofenced area, automatically stop the collection of the data while the vehicle is operated outside the geofenced area.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION

Figure 1:
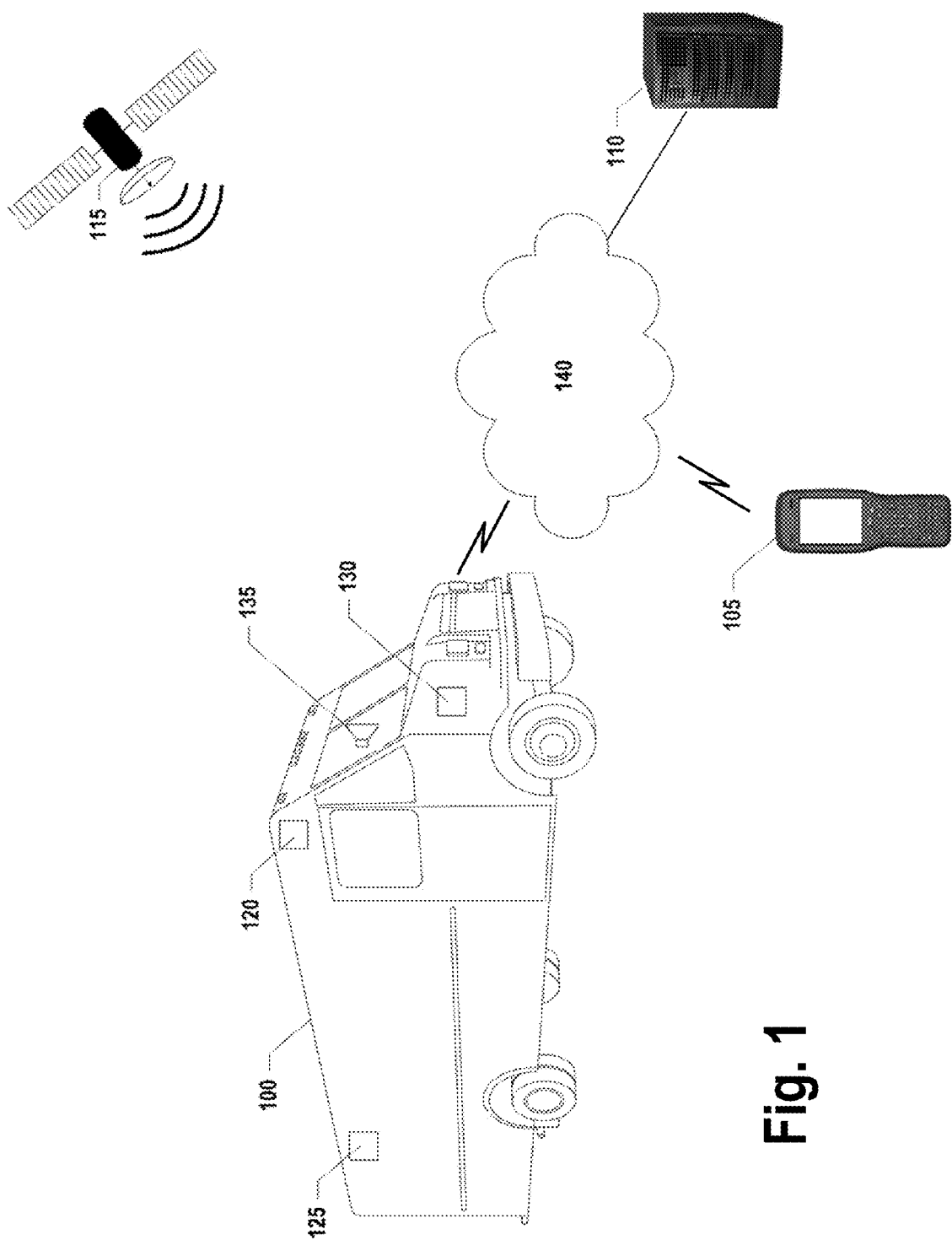
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system that can be used in conjunction with various embodiments of the present invention. As shown in FIG. 1, the system may include one or more vehicles 100, one or more portable devices 105, one or more monitoring servers 110, one or more Global Positioning System (GPS) satellites 115, one or more location sensors 120, one or more telematics sensors 125, one or more data collection devices 130, one or more networks 140, one or more imaging devices 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, the vehicle 100 (such as a delivery vehicle) may include one or more location sensors 120, one or more telematics sensors 125, one or more data collection devices 130, one or more imaging devices 135, and/or the like.

i. Exemplary Data Collection Device

Figure 2:
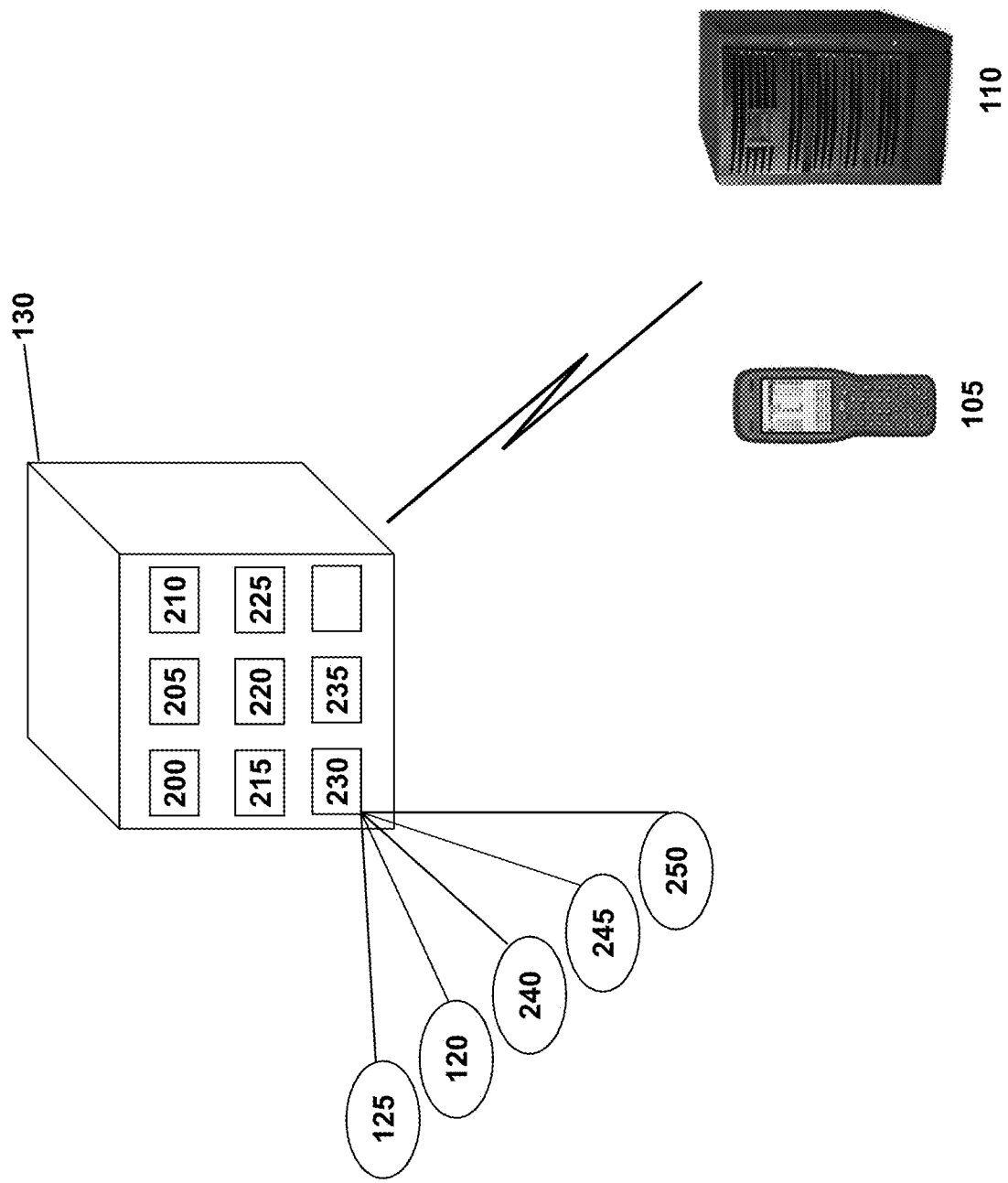
FIG. 2 is a diagram of a data collection device that may be used in association with certain embodiments of the present invention.

Reference is now made to FIG. 2, which provides a block diagram of an exemplary data collection device 130. The data collection device 130 may collect location and telematics sensor data and transmit the data to the portable device 105 and/or the monitoring server 110 via one of several communication methods.

In one embodiment, the data collection device 130 may include, be associated with, or be in communication with one or more processors 200, one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving data from various sensors (e.g., via a CAN-bus), one or more communication ports 205 for transmitting data, one or more radio frequency identification (RFID) tags 250, one or more power sources 220, one or more data radios 235 for communication with a variety of communication networks, one or more memory modules 210, and one or more programmable logic controllers (PLC) 225. It should be noted that many of these components may be located in the vehicle 100 but external to the data collection device 130.

In one embodiment, the one or more location sensors 120 may be one of several components in communication with or available to the data collection device 130. Moreover, the one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's driver and with various communication points (e.g., cellular towers or Wi-Fi access points) positioned at various locations throughout a geographic area to determine the location of the vehicle 100 and/or its driver. The one or more location sensors 120 may be used to receive latitude, longitude, altitude, geocode, course, position, time, and/or speed data (e.g., location data). The one or more location sensors 120 may also communicate with the monitoring server 110, the data collection device 130, and/or a similar network entity.

As indicated, in addition to the one or more location sensors 120, the data collection device 130 may include or be associated with one or more telematics sensors 125. For example, the telematics sensors 125 may include vehicle sensors, such as engine, fuel, odometer, tire pressure, location, weight, door, and speed sensors. The telematics data may include, but is not limited to, vehicle speed data, RPM data, tire pressure data, oil pressure data, seat belt usage data, mileage data, fuel data, idle data, and/or the like. The telematics sensors 125 may include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data and/or meteorological data.

In one embodiment, the ECM 245 may be one of several components in communication with or available to the data collection device 130. The ECM 245, which may be a scalable and subservient device to the data collection device 130, may have data processing capability to decode and store analog and digital inputs from vehicle systems and sensors. The ECM 245 may further have data processing capability to collect and present vehicle data to the J-Bus (which may allow transmission to the data collection device 130), and output standard vehicle diagnostic codes when received from a vehicle's J-Bus-compatible on-board controllers 240 or sensors.

As indicated, a communication port 230 may be one of several components available in the data collection device 130. Embodiments of the communication port 230 may include an Infrared Data Association (IrDA) communication port, a data radio, and/or a serial port. The communication port 230 may receive instructions for the data collection device 130. These instructions may be specific to the vehicle 100 in which the data collection device 130 is installed, specific to the geographical area in which the vehicle 100 will be traveling, or specific to the function the vehicle 100 serves within the fleet. In one embodiment, the data radio 235 may be configured to communicate with a wireless wide area network (WWAN), wireless local area network (WLAN), or wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via these communication standards and protocols, the data collection device 130 can communicate with various other entities.

In one embodiment, one or more RFID tags 250 may be one of several components available for use with the data collection device 130. One embodiment of the one or more RFID tags 250 may include active RFID tags, each of which may comprise at least one of the following: (1) an internal clock; (2) a memory; (3) a microprocessor; and (4) at least one input interface for connecting with sensors located in the vehicle 100 or the data collection device 130. Another embodiment of the RFID tags 250 may be passive RFID tags.

ii. Exemplary Imaging Devices

The vehicle 100 may also include one or more imaging devices 135 disposed therein. For example, imaging devices 135 may be disposed on the vehicle 100 facing out toward the front, rear, and/or sides of the vehicle 100. Similarly, imaging devices 135 may be disposed on the vehicle 100 facing in toward the driver, passengers, or cargo in the vehicle 100.

In one embodiment, the imaging devices 135 may be analog or digital cameras (or video cameras or combinations thereof) for capturing images (e.g., image data). For example, the imaging devices 135 may be cameras with wide angle lenses and/or cameras with narrow angle lenses. In one embodiment, the imaging devices 135 may be dual-view imaging devices 135 that simultaneously record video inside and outside of the vehicle 100. The imaging devices 135 may be configured to continuously record images and/or video. Similarly, the imaging devices 135 may be configured to automatically record and stop recording image data upon the occurrence of certain specified events, such as the entering and/or exiting of a geofenced area.

In one embodiment, the imaging devices 135 may include one or more processors, one or more temporary memory storage areas, and/or one or more permanent memory storage areas. For instance, the imaging devices 135 can capture (and timestamp) images (e.g., image data) and store them temporarily in the temporary memory storage areas or permanently within the imaging devices 135. In one embodiment, the imaging devices 135 may also be connected to (or include) a network interface for communicating with various entities. As indicated above, this communication may be via the same or different wired or wireless networks using a variety of wired or wireless transmission protocols. For example, using such protocols, the imaging devices 135 may communicate with (e.g., receive instructions from and transmit image data to) the portable device 105, the monitoring server 110, and/or the data collection device 130.

b. Exemplary Monitoring Server

Figure 3:
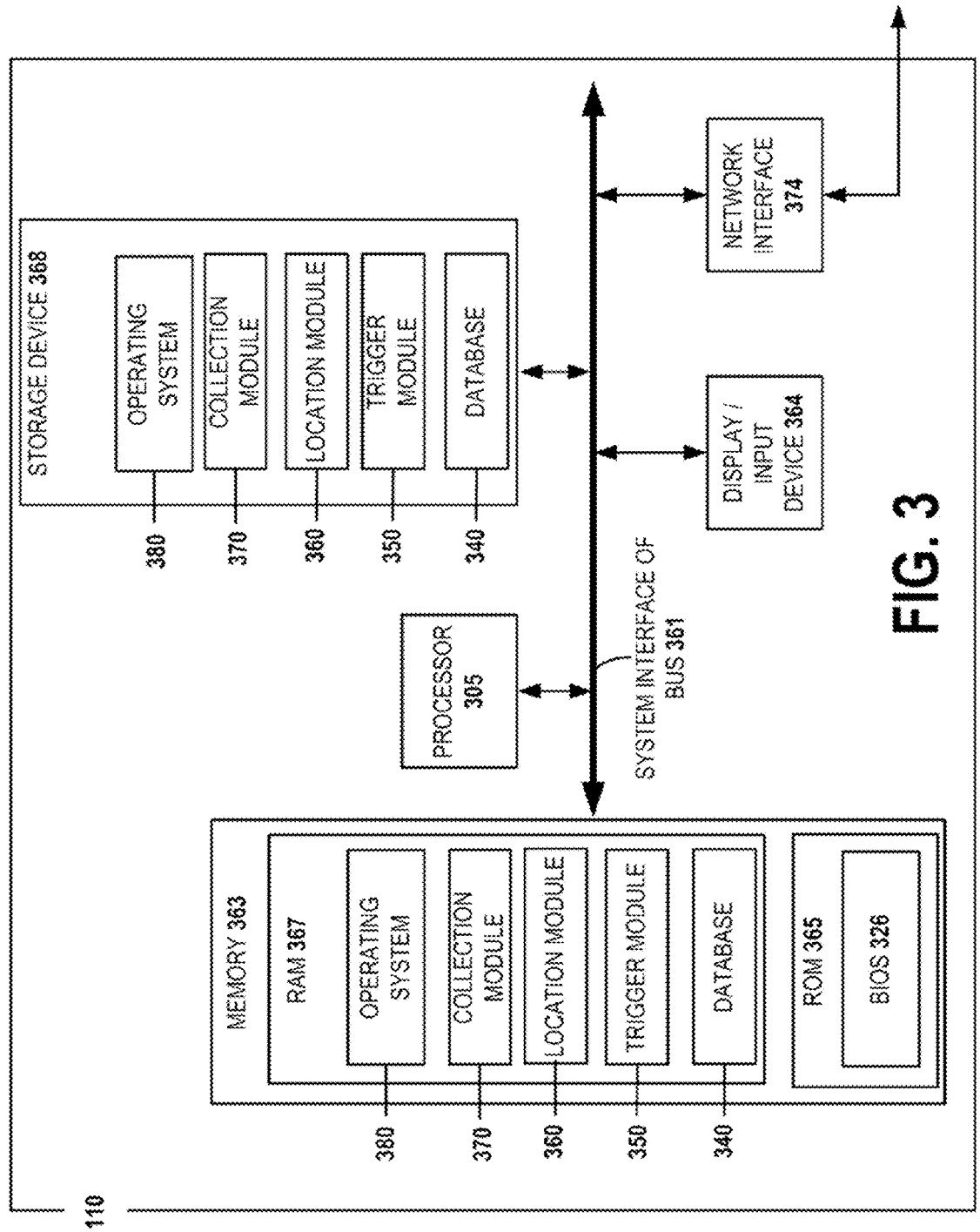
FIG. 3 is a schematic of a monitoring server in accordance with certain embodiments of the present invention.

FIG. 3 provides a schematic of a monitoring server 110 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the monitoring server 110 may include a processor 305 that communicates with other elements within the monitoring server 110 via a system interface or bus 361. The processor 305 may be embodied in a number of different ways. For example, the processor 305 may be embodied as one or more processing elements, one or more microprocessors with accompanying digital signal processors, one or more processors without an accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, or the like.

In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention when configured accordingly. A display device/input device 364 for receiving and displaying data may also be included in or associated with the monitoring server 110. The display device/input device 364 may be, for example, a keyboard or pointing device that is used in combination with a monitor. The monitoring server 110 may further include transitory and non-transitory memory 363, which may include both random access memory (RAM) 367 and read only memory (ROM) 365. The monitoring server's ROM 365 may be used to store a basic input/output system (BIOS) 326 containing the basic routines that help to transfer information to the different elements within the monitoring server 110.

In addition, in one embodiment, the monitoring server 110 may include at least one storage device 368, such as a hard disk drive, a CD drive, a DVD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 368 may be connected to the system bus 361 by an appropriate interface.

Furthermore, a number of program modules may be stored by the various storage devices 368 and/or within RAM 367. Such program modules may include an operating system 380, a collection module 370, a location module 360, and a trigger module 350. As discussed in greater detail below, these modules may control certain aspects of the operation of the monitoring server 110 with the assistance of the processor 305 and operating system 380—although their functionality need not be modularized. In addition to the program modules, the monitoring server 110 may store or be in communication with one or more databases, such as database 340.

Also located within or associated with the monitoring server 110, in one embodiment, is a network interface 374 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 110 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the monitoring server's 110 components may be located remotely from other monitoring server 110 components. Furthermore, one or more of the components may be combined and additional components performing functions described herein may be included in the monitoring server 110.

c. Exemplary Portable Device

Figure 4:
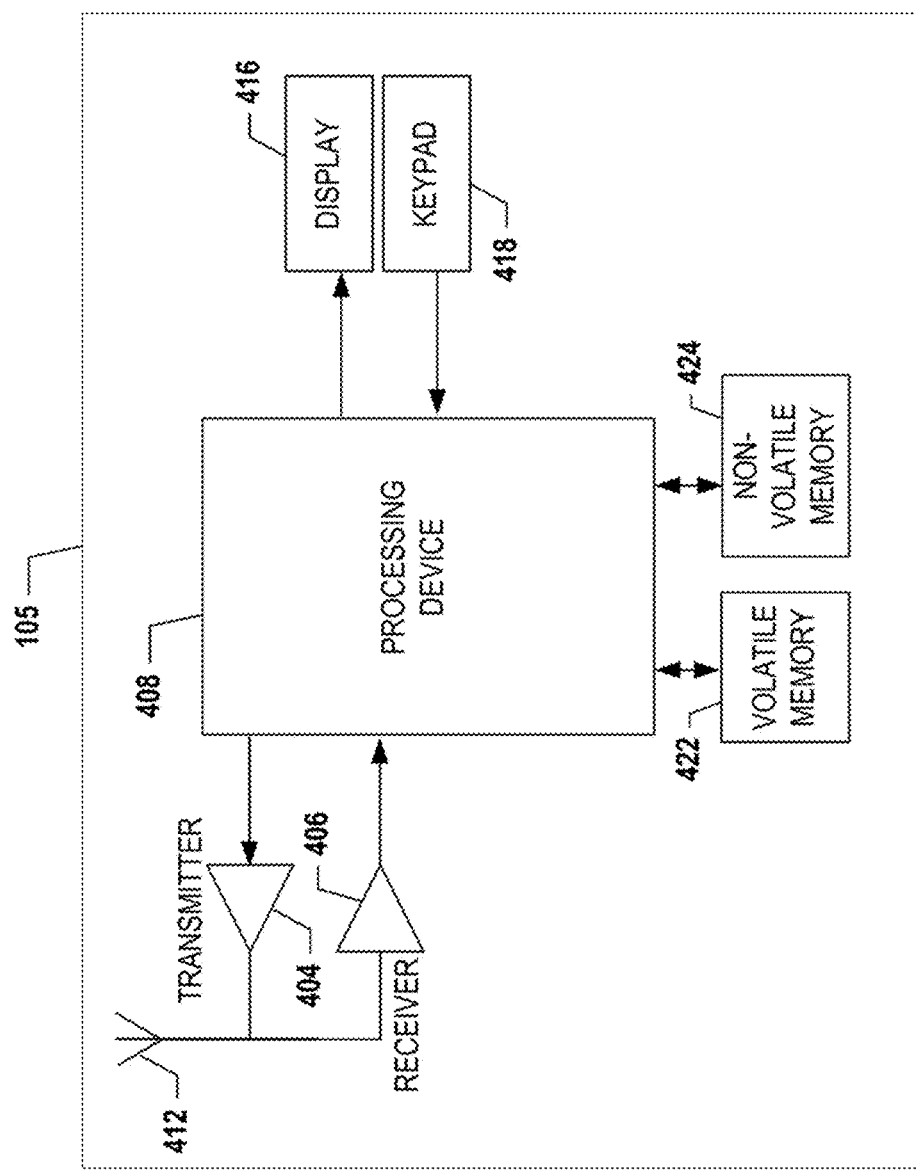
FIG. 4 is a schematic of a portable device in accordance with certain embodiments of the present invention.

With respect to the portable device 105, FIG. 4 provides an illustrative schematic representative of a portable device 105 that can be used in conjunction with the embodiments of the present invention (e.g., a portable device 105 carried by a delivery driver). As shown in FIG. 4, the portable device 105 can include an antenna 412, a transmitter 404, a receiver 406, and a processing device 408, e.g., a processor, controller, or the like, that provides signals to and receives signals from the transmitter 404 and receiver 406, respectively.

The signals provided to and received from the transmitter 404 and the receiver 406, respectively, may include signaling information in accordance with an air interface standard of applicable wireless (or wired) systems. In this regard, the portable device 105 may be capable of operating with one or more air interface standards, communication protocols, modulation types, and access types. More particularly, the portable device 105 may operate in accordance with any of a number of second-generation (2G) communication protocols, third-generation (3G) communication protocols, and/or the like. Further, for example, the portable device 105 may operate in accordance with any of a number of different wireless networking techniques, such as GPRS, UMTS, CDMA2000, WCDMA, TD-SCDMA, LTE, E-UTRAN, Wi-Fi, WiMAX, UWB, and/or any other wireless protocol. Via these communication standards and protocols, the portable device 105 can communicate with the monitoring server 110 and/or various other entities.

The portable device 105 may also comprise a user interface (that can include a display 416 coupled to a processing device 408) and/or a user input interface (coupled to the processing device 408). The user input interface can comprise any of a number of devices allowing the portable device 105 to receive data, such as a keypad 418, a touch display (not shown), barcode reader (not shown), RFID tag reader (not shown), or other input device. In embodiments including a keypad 418, the keypad 418 can include the conventional numeric (0-9) and related keys (#, *), and other keys used for operating the portable device 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the portable device 105 may also include a battery, such as a vibrating battery pack, for powering the various circuits that are required to operate the portable device 105, as well as optionally providing mechanical vibration as a detectable output.

The portable device 105 can also include volatile memory 422 and/or non-volatile memory 424, which can be embedded and/or may be removable. For example, the non-volatile memory may be embedded or removable MMCs, SD memory cards, Memory Sticks, EEPROM, flash memory, hard disk, or the like. The memory can store any of a number of pieces or amount of information and data used by the portable device 105 to implement the functions of the portable device 105. The memory can also store content, such as computer program code for an application and/or other computer programs.

The portable device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites. In addition, data regarding, for example, heading and estimated time of arrival (ETA) can also be captured, which enhances the determination of the position of the GPS module.

III. EXEMPLARY SYSTEM OPERATION

Figure 5:
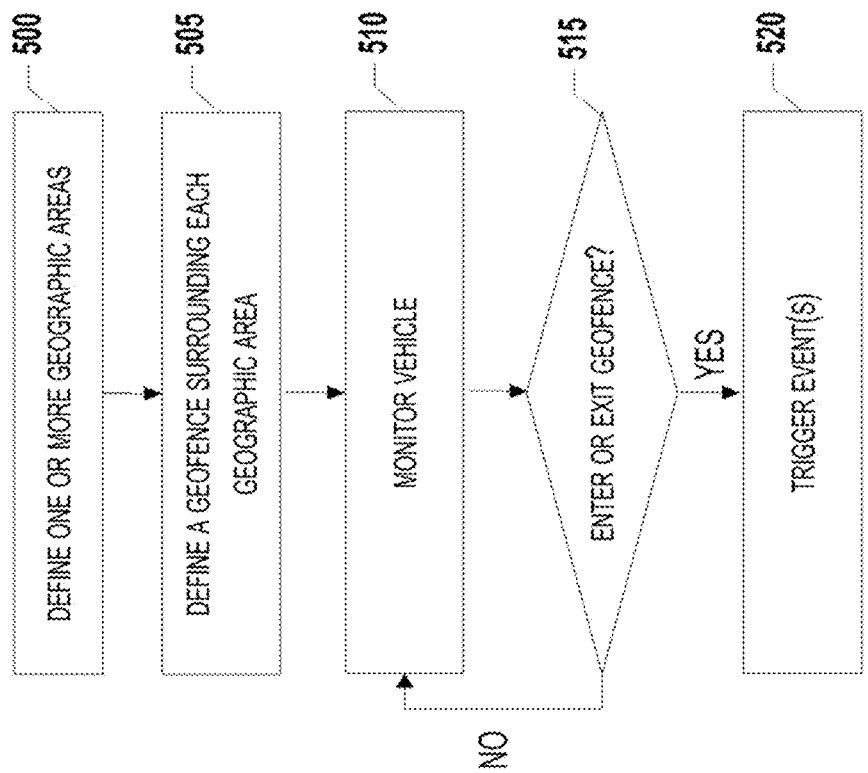
FIG. 5 is a flowchart illustrating operations and processes that can be used in accordance with various embodiments of the present invention.

Reference will now be made to FIG. 5. FIG. 5 illustrates operations and processes that can be performed to trigger geo-fence based events.

a. Defined Geographic Areas

In one embodiment, as shown in FIG. 5, the process may be begin at Block 500 with a computing entity (e.g., via a user operating a computing entity) defining one or more geographic areas. In one embodiment, the geographic areas may correspond to areas within which one or more parcels may be picked up and/or delivered (e.g., a delivery route). Each geographic area may, for example, represent an area in which a single driver may be capable of handling all parcel pick-ups and deliveries within a given delivery cycle (e.g., an eight-hour day). In one embodiment, the geographic areas may correspond to bus routes or taxis routes (e.g., driven by school bus, transit bus drivers, and/or taxis drivers). In one embodiment, the geographic areas may be defined based on pre-defined size requirements (e.g., a new geographic area may occur every 100,000 square feet). Alternatively, the geographic areas may be defined based on zoning classifications associated with different geographic areas (e.g., an office park may make up an individual geographic area).

In another embodiment, one or more of the geographic areas may be defined based on the existence of one or more housing subdivisions, office parks, and/or the like. For example, each housing subdivision, or a combination of two or more abutting housing subdivisions, may make up a defined geographic area. This may depend, for example, on the square footage of each subdivision and/or the number of houses within each subdivision.

In yet another alternative embodiment, one or more of the geographic areas may be defined based on the average number of potential stops (e.g., delivery stops, stoplights, and/or stop signs) and/or the frequency of stops within certain geographic areas. This may be determined, for example, based on information gathered regarding past pick-ups and deliveries within that geographic area.

According to various embodiments of the present invention, a geographic area may overlap or reside wholly within another geographic area. Geographic areas may, for example, be as small as a single delivery/pick-up stop or a suite within a commercial building, or as large as an entire town, city, county, or state. According to various embodiments, the geographic areas need not be continuous. In other words, a geographic area may specifically exclude an area that would otherwise fall within the geographic area (e.g., such that the geographic area forms a donut or similar shape around the excluded area).

The geographic areas may be defined based on any number and combination of factors including, but not limited to, those described above. The foregoing examples are therefore provided for exemplary purposes only and should not be taken in any way as limiting embodiments of the present invention to the examples provided.

b. Defined Geofences

In one embodiment, once the geographic areas have been defined, a computing entity (e.g., via a user operating a computing entity) may define one or more geofences (Block 505), such as defining a geofence around a geographic area. The geofences may be defined to surround a defined geographic area, a neighborhood, a parcel delivery route, a zip code, a school zone, a city, and/or the like. The geofence may be defined, for example, by the latitude and longitude coordinates associated with various points along the perimeter of the geographic area. Alternatively, the geofence may be defined based on latitude and longitude coordinates of the center, as well as the radius, of the geographic area. The geographic area, and therefore the geofence, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention. Similarly, a geofence may overlap or reside wholly within another geofence. Geofences may, for example, be as small as a single delivery/pick-up stop or a suite within a commercial building, or as large as an entire city, county, or state.

In one embodiment, once at least one geofence has been defined, the coordinates (or similar means for defining the geofenced areas) may be stored in a database associated with, for example, the data collection device 130, portable device 105, and/or monitoring server 110. Thus, as the vehicle enters and exits the defined one or more defined geofences, a computing entity (the data collection device 130, portable device 105, and/or monitoring server 110) can monitor the location of the vehicle 100 and trigger/initiate certain events based on the vehicle's 100 location.

c. Geofence-Based Triggers

In one embodiment, after the one or more geofences have been defined, the location of the vehicle 100 can be monitored (Block 510). In particular, the location of the vehicle can be monitored by any of a variety of computing entities (e.g., via a location module 360), including the data collection device 130, the portable device 105, and/or the monitoring server 110. For example, as noted above, the vehicle's 100 location at a particular time may be determined with the aid of one or more location-determining devices and/or one or more location sensors 120 (e.g., GNSS sensors). By using the vehicle's 100 location, a computing entity (data collection device 130, portable device 105, or monitoring server 110) can determine, for example, when the vehicle 100 enters and/or exits a defined geofence (Block 515).

In one embodiment, as indicated in Block 520, in response to (e.g., after) a determination that a vehicle 100 has entered or exited a defined geofence, a computing entity (e.g., the data collection device 130, portable device 105, or monitoring server 110) can automatically trigger/initiate one or more events. In various embodiments, this functionality can provide for the automatic collection of data (e.g., image data and telematics data) as vehicles 100 enter and exit defined geofences.

In one embodiment, after a computing entity (e.g., the data collection device 130, portable device 105, or monitoring server 110) determines that a vehicle 100 has entered a defined geofence, the computing entity can transmit/initiate a communication that causes the vehicle's 100 one or more (i) imaging devices 135 to automatically turn on and/or begin recording image data and/or (ii) data collection devices 130 to automatically turn on and/or begin collecting telematics data. For example, the data collection device 130 can determine that the vehicle 100 has entered a defined geofence and automatically transmit/initiate a communication (i) to the one or more imaging devices 135 that causes them to automatically turn on and/or begin recording image data and/or (ii) that causes the data collection device 130 to begin collecting telematics data. In another example, the portable device 105 (and/or monitoring server 110) can determine that the vehicle 100 has entered a defined geofence and transmit/initiate a communication (i) to the one or more imaging devices 135 that causes them to automatically turn on and/or begin recording image data and/or (ii) to the one or more data collection devices 130 that causes them to automatically turn on and/or begin collecting telematics data. Similarly, after a computing entity (e.g., the data collection device 130, portable device 105, or monitoring server 110) determines that the vehicle 100 has exited the defined geofence, the computing entity can transmit/initiate a communication that causes the vehicle's 100 one or more (i) imaging devices 135 to automatically turn off and/or stop recording image data and/or (ii) data collection devices 130 to automatically turn off and/or stop collecting telematics data.

Alternatively, in one embodiment, after a computing entity (e.g., the data collection device 130, portable device 105, or monitoring server 110) determines that a vehicle 100 has exited a defined geofence, the computing entity can transmit/initiate a communication that causes the vehicle's 100 one or more (i) imaging devices 135 to automatically turn on and/or begin recording image data (e.g., via a trigger module 350) and/or (ii) data collection devices 130 to automatically turn on and/or begin collecting telematics data (e.g., via a trigger module 350). Similarly, after a computing entity (e.g., the data collection device 130, portable device 105, or monitoring server 110) determines that the vehicle 100 has entered the defined geofence, the computing entity can transmit/initiate a communication that causes the vehicle's 100 one or more (i) imaging devices 135 to automatically turn off and/or stop recording image data and/or (ii) data collection devices 130 to automatically turn off and/or stop collecting telematics data (e.g., as described previously).

In one embodiment, the one or more (i) imaging devices 135 may be configured to continuously record image data and/or (ii) data collection devices 130 may be configured to continuously collect telematics data when the vehicle 100 is in use. In this particular embodiment, after a computing entity (e.g., the data collection device 130, portable device 105, or monitoring server 110) determines that the vehicle 100 has exited a defined geofence, the computing entity can transmit/initiate a communication that causes the vehicle's 100 one or more (i) imaging devices 135 to automatically transmit (or store) image data being recorded to a computing entity and/or (ii) data collection devices 130 to automatically transmit (or store) telematics data being collected to a computing entity (e.g., as described previously). Similarly, after a computing entity (e.g., the data collection device 130, portable device 105, or monitoring server 110) determines that the vehicle 100 has entered the defined geofence, the computing entity can transmit/initiate a communication that causes the vehicle's 100 one or more (i) imaging devices 135 to automatically stop transmitting (or storing) image data being recorded to a computing entity and/or (ii) data collection devices 130 to automatically stop transmitting (or storing) telematics data being collected to a computing entity (e.g., as described previously).

Alternatively, in one embodiment, the one or more (i) imaging devices 135 may be configured to continuously record image data and/or (ii) data collection devices 130 may be configured to continuously collect telematics data when the vehicle 100 is in use. In a particular embodiment, after a computing entity (e.g., the data collection device 130, portable device 105, or monitoring server 110) determines that the vehicle 100 has entered a defined geofence, the computing entity can transmit/initiate a communication that causes the vehicle's 100 one or more (i) imaging devices 135 to automatically transmit (or store) image data being recorded to a computing entity and/or (ii) data collection devices 130 to automatically transmit (or store) telematics data being collected to a computing entity (e.g., as described previously). Similarly, after a computing entity (e.g., the data collection device 130, portable device 105, or monitoring server 110) determines that the vehicle 100 has exited the defined geofence, the computing entity can transmit/initiate a communication that causes the vehicle's 100 one or more (i) imaging devices 135 to automatically stop transmitting (or storing) image data being recorded to a computing entity and/or (ii) data collection devices 130 to automatically stop transmitting (or storing) telematics data being collected to a computing entity (e.g., as described previously).

In one embodiment, the one or more (i) imaging devices 135 may be configured to continuously record image data and/or (ii) data collection devices 130 may be configured to continuously collect telematics data when the vehicle 100 is in use. In a particular embodiment, after a computing entity (e.g., the data collection device 130, portable device 105, or monitoring server 110) determines that the vehicle 100 has exited a defined geofence, the computing entity can transmit/initiate a communication that causes the vehicle's 100 one or more (i) imaging devices 135 to automatically begin storing image data being recorded to one or more memory storage areas (e.g., via a collection module 370) and/or (ii) data collection devices 130 to automatically begin storing telematics data being collected to one or more memory storage areas (e.g., as described previously). Similarly, after a computing entity (e.g., the data collection device 130, portable device 105, or monitoring server 110) determines that the vehicle 100 has entered the defined geofence, the computing entity can transmit/initiate a communication that causes the vehicle's 100 one or more (i) imaging devices 135 to automatically stop storing image data being recorded to one or more memory storage areas and/or (ii) data collection devices 130 to automatically stop storing telematics data being collected to one or more memory storage areas (e.g., as described previously).

Alternatively, in one embodiment, the one or more (i) imaging devices 135 may be configured to continuously record image data and/or (ii) data collection devices 130 may be configured to continuously collect telematics data when the vehicle 100 is in use. In a particular embodiment, after a computing entity (e.g., the data collection device 130, portable device 105, or monitoring server 110) determines that the vehicle 100 has entered a defined geofence, the computing entity can transmit/initiate a communication that causes the vehicle's 100 one or more (i) imaging devices 135 to automatically begin storing image data being recorded to one or more memory storage areas and/or (ii) data collection devices 130 to automatically begin storing telematics data being collected to one or more memory storage areas (e.g., as described previously). Similarly, after a computing entity (e.g., the data collection device 130, portable device 105, or monitoring server 110) determines that the vehicle 100 has exited the defined geofence, the computing entity can transmit/initiate a communication that causes the vehicle's 100 one or more (i) imaging devices 135 to automatically stop storing image data being recorded to one or more memory storage areas and/or (ii) data collection devices 130 to automatically stop storing telematics data being collected to one or more memory storage areas (e.g., as described previously). As will be recognized, a variety of approaches and techniques may be used to trigger/initiate the automated collection of data, such as triggers based on harsh braking, turning an engine one or off, and/or the like. Accordingly, the foregoing examples are provided for illustrative purposes only and should not be taken in any way as limiting embodiments of the present invention to the examples provided.

IV. CONCLUSION

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for the automated collection of data comprising:
   monitoring, via one or more processors, the location of a vehicle to determine whether the vehicle has entered a geofenced area, wherein (1) data associated with the vehicle is collected while the vehicle is operated outside the geofenced area and (2) the data is selected from the group consisting of (a) image data collected via one or more imaging devices disposed on the vehicle and (b) telematics data collected via one or more data collection devices disposed on the vehicle; and
   after determining that the vehicle has entered the geofenced area, automatically stopping, via the one or more processors, the collection of the data while the vehicle is operated within the geofenced area.

2. The method of claim 1 further comprising:
   monitoring the location of the vehicle to determine whether the vehicle has exited the geofenced area; and
   after determining that the vehicle has exited the geofenced area, automatically starting the collection of the data while the vehicle is operated outside the geofenced area.

3. The method of claim 1, wherein the data collected comprises image data collected via one or more imaging devices disposed on the vehicle.

4. The method of claim 3 further comprising transmitting at least a portion of the image data from the one or more imaging devices to a computing entity.

5. The method of claim 1, wherein the data collected comprises telematics data collected via one or more data collection devices disposed on the vehicle.

6. The method of claim 5 further comprising transmitting at least a portion of the telematics data from the one or more data collection devices disposed on the vehicle to a computing entity.

7. A method for the automated collection of data comprising:
monitoring, via one or more processors, the location of a vehicle to determine whether the vehicle has exited a geofenced area, wherein (1) data associated with the vehicle is collected while the vehicle is operated within the geofenced area and (2) the data is selected from the group consisting of (a) image data collected via one or more imaging devices disposed on the vehicle and (b) telematics data collected via one or more data collection devices disposed on the vehicle; and
after determining that the vehicle has exited the geofenced area, automatically stopping, via the one or more processors, the collection of the data while the vehicle is operated outside the geofenced area.

8. The method of claim 7 further comprising:
monitoring the location of the vehicle to determine whether the vehicle has entered the geofenced area; and
after determining that the vehicle has entered the geofenced area, automatically starting the collection of the data while the vehicle is operated within the geofenced area.

9. The method of claim 7, wherein the data collected comprises image data collected via one or more imaging devices disposed on the vehicle.

10. The method of claim 9 further comprising transmitting at least a portion of the image data from the one or more imaging devices to a computing entity.

11. The method of claim 7, wherein the data collected comprises telematics data collected via one or more data collection devices disposed on the vehicle.

12. The method of claim 11 further comprising transmitting at least a portion of the telematics data from the one or more data collection devices disposed on the vehicle to a computing entity.

13. A system comprising one or more imaging devices and one or more data collection devices, the system configured to:
monitor the location of a vehicle to determine whether the vehicle has entered a geofenced area, wherein (1) data associated with the vehicle is collected while the vehicle is operated outside the geofenced area and (2) the data is selected from the group consisting of (a) image data collected via one or more imaging devices disposed on the vehicle and (b) telematics data collected via one or more data collection devices disposed on the vehicle; and
after determining that the vehicle has entered the geofenced area, automatically stop the collection of the data while the vehicle is operated within the geofenced area.

14. The system of claim 13 further configured to:
monitor the location of the vehicle to determine whether the vehicle has exited the geofenced area; and
after determining that the vehicle has exited the geofenced area, automatically start the collection of the data while the vehicle is operated outside the geofenced area.

15. The system of claim 13, wherein the data collected comprises image data collected via the one or more imaging devices disposed on the vehicle.

16. The system of claim 15 further configured to transmit at least a portion of the image data from the one or more imaging devices to a computing entity.

17. The system of claim 13, wherein the data collected comprises telematics data collected via the one or more data collection devices disposed on the vehicle.

18. The system of claim 17 further configured to transmit at least a portion of the telematics data from the one or more data collection devices disposed on the vehicle to a computing entity.

19. A system comprising one or more imaging devices and one or more data collection devices, the system configured to:
monitor the location of a vehicle to determine whether the vehicle has exited a geofenced area, wherein (1) data associated with the vehicle is collected while the vehicle is operated within the geofenced area and (2) the data is selected from the group consisting of (a) image data collected via one or more imaging devices disposed on the vehicle and (b) telematics data collected via one or more data collection devices disposed on the vehicle; and
after determining that the vehicle has exited the geofenced area, automatically stop the collection of the data while the vehicle is operated outside the geofenced area.

20. The system of claim 19 further configured to:
monitor the location of the vehicle to determine whether the vehicle has entered the geofenced area; and
after determining that the vehicle has entered the geofenced area, automatically start the collection of the data while the vehicle is operated within the geofenced area.

21. The system of claim 19, wherein the data collected comprises image data collected via the one or more imaging devices disposed on the vehicle.

22. The system of claim 21 further configured to transmit at least a portion of the image data from the one or more imaging devices to a computing entity.

23. The system of claim 19, wherein the data collected comprises telematics data collected via the one or more data collection devices disposed on the vehicle.

24. The system of claim 23 further configured to transmit at least a portion of the telematics data from the one or more data collection devices disposed on the vehicle to a computing entity.

* * * * *